United States Patent
Weisz et al.

(10) Patent No.: US 10,136,572 B2
(45) Date of Patent: Nov. 27, 2018

(54) GAUGE WHEEL WEAR EXTENDER AND DISC SCRAPER FOR CROP PLANTERS AND SINGLE DISC AIR DRILLS

(71) Applicants: Robin A. Weisz, Hurdsfield, ND (US); Ted Juhl, Drayton, ND (US)

(72) Inventors: Robin A. Weisz, Hurdsfield, ND (US); Ted Juhl, Drayton, ND (US)

( * ) Notice: Subject to any disclaimer, the term of this patent is extended or adjusted under 35 U.S.C. 154(b) by 0 days.

(21) Appl. No.: 15/339,250

(22) Filed: Oct. 31, 2016

(65) Prior Publication Data
US 2017/0208734 A1    Jul. 27, 2017

Related U.S. Application Data

(60) Provisional application No. 62/287,437, filed on Jan. 26, 2016.

(51) Int. Cl.
*A01C 5/06* (2006.01)
*A01C 7/20* (2006.01)

(52) U.S. Cl.
CPC .............. *A01C 5/064* (2013.01); *A01C 7/203* (2013.01); *Y02P 60/16* (2015.11)

(58) Field of Classification Search
CPC .. A01C 5/06; A01C 5/064; A01C 7/20; A01C 7/203
USPC ........................................................ 111/163
See application file for complete search history.

(56) References Cited

U.S. PATENT DOCUMENTS

| 5,483,907 | A   | * | 1/1996  | Gaalswyk | A01B 71/00 |
| | | | | | 111/163 |
| 8,720,351 | B1  | * | 5/2014  | Wipf     | A01C 7/203 |
| | | | | | 111/137 |
| 9,474,203 | B2  | * | 10/2016 | Anderson | A01C 5/06  |
| 2010/0251947 | A1 | * | 10/2010 | Mariman | A01C 5/06 |
| | | | | | 111/149 |
| 2014/0014377 | A1 | * | 1/2014  | Hesla    | A01C 7/203 |
| | | | | | 172/1 |
| 2016/0374257 | A1 | * | 12/2016 | Roszman  | A01C 5/064 |
| | | | | | 111/69 |

FOREIGN PATENT DOCUMENTS

WO    WO-2008022373 A1  *  2/2008  .......... A01B 63/166

* cited by examiner

*Primary Examiner* — John Weiss
(74) *Attorney, Agent, or Firm* — Christopher A. Proskey; BrownWinick Law Firm

(57) ABSTRACT

A wear extender is presented for use with planters, air seeders and drills that utilize the engagement of a flexible wheel with a disc to scrape mud from the side of the disc. The wear extender is formed of an ultra-high molecular weight plastic that is compression molded. The wear extender is generally cylindrical in shape and when installed covers the interior edge of the tire. Installation of the wear extender extends the life of the tire and reduces the need to replace the tire. In addition, due to the more-rigid nature of the wear extender as compared to the more-flexible nature of the tire, the wear extender does a better job of scraping mud than the tire. As such, use of the wear extender reduces the number amount of downtime that occurs due to poor scraping and reduces the amount and cost of maintenance due to tire wear.

17 Claims, 6 Drawing Sheets

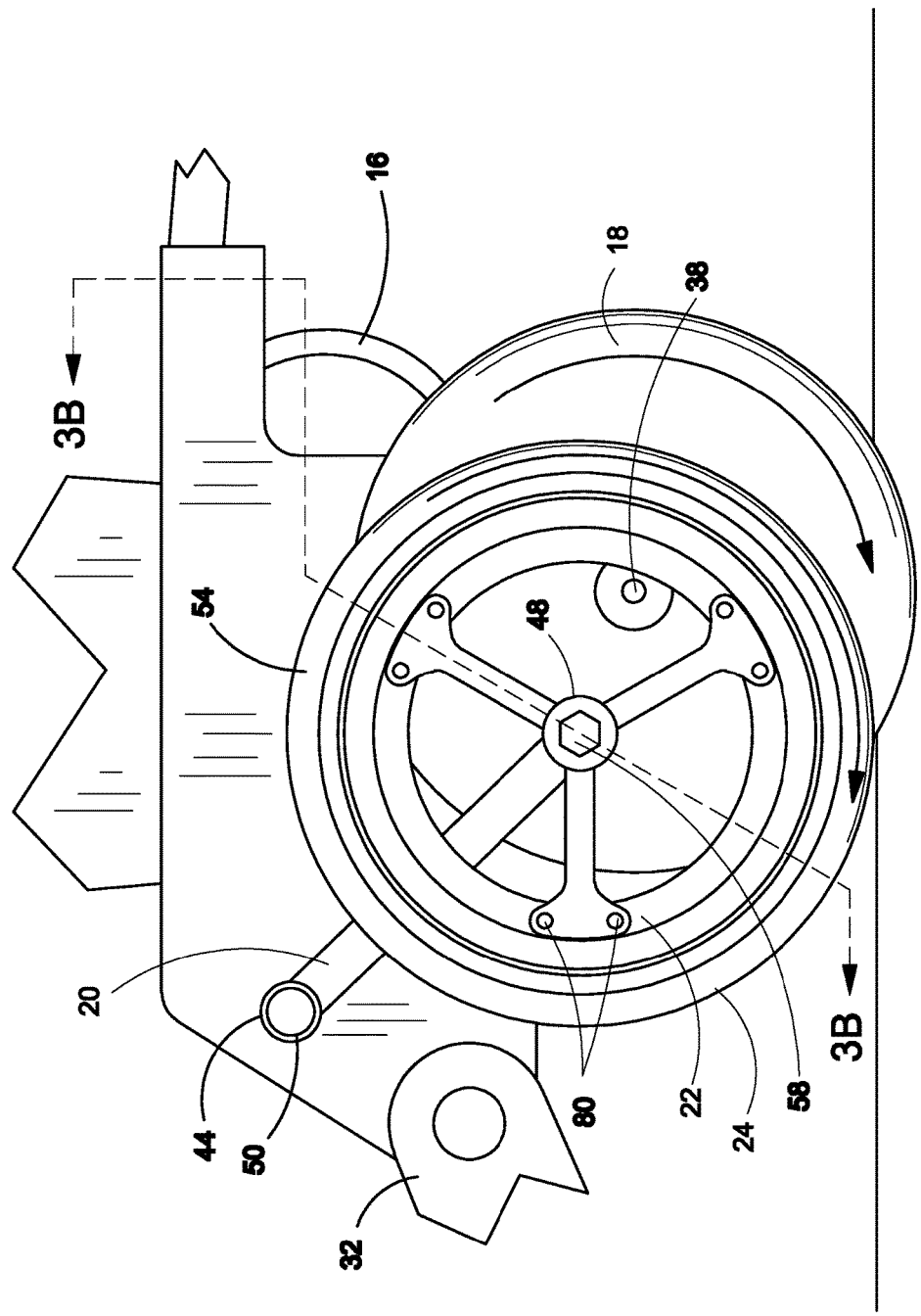

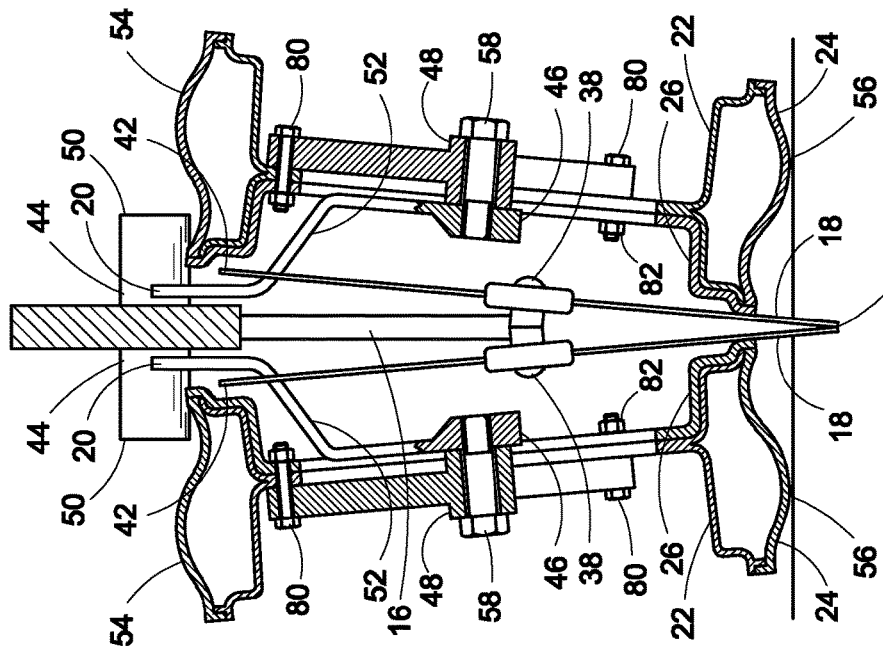
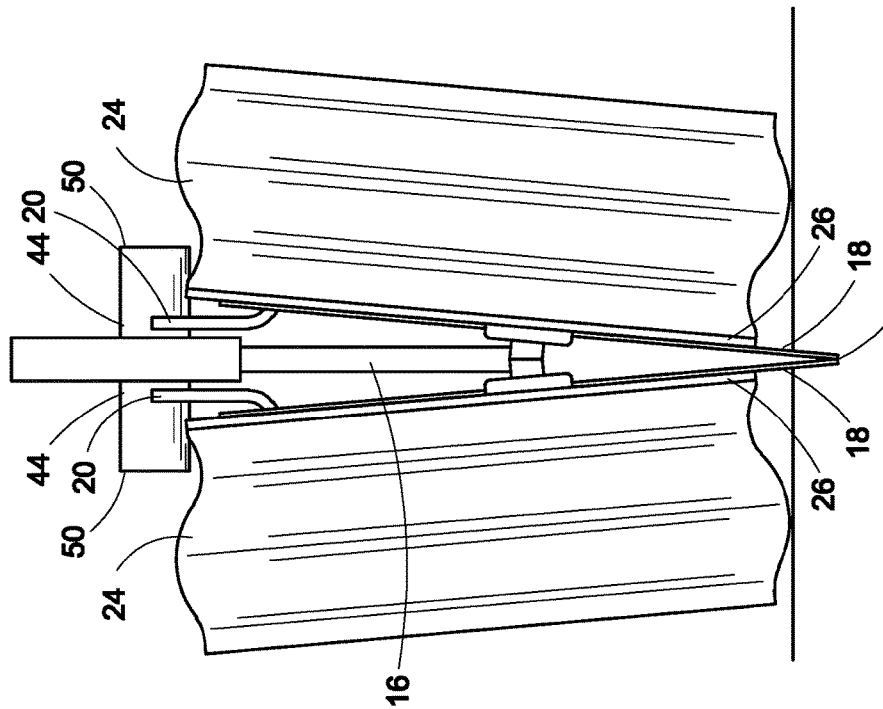
Fig. 3A
Fig. 3B

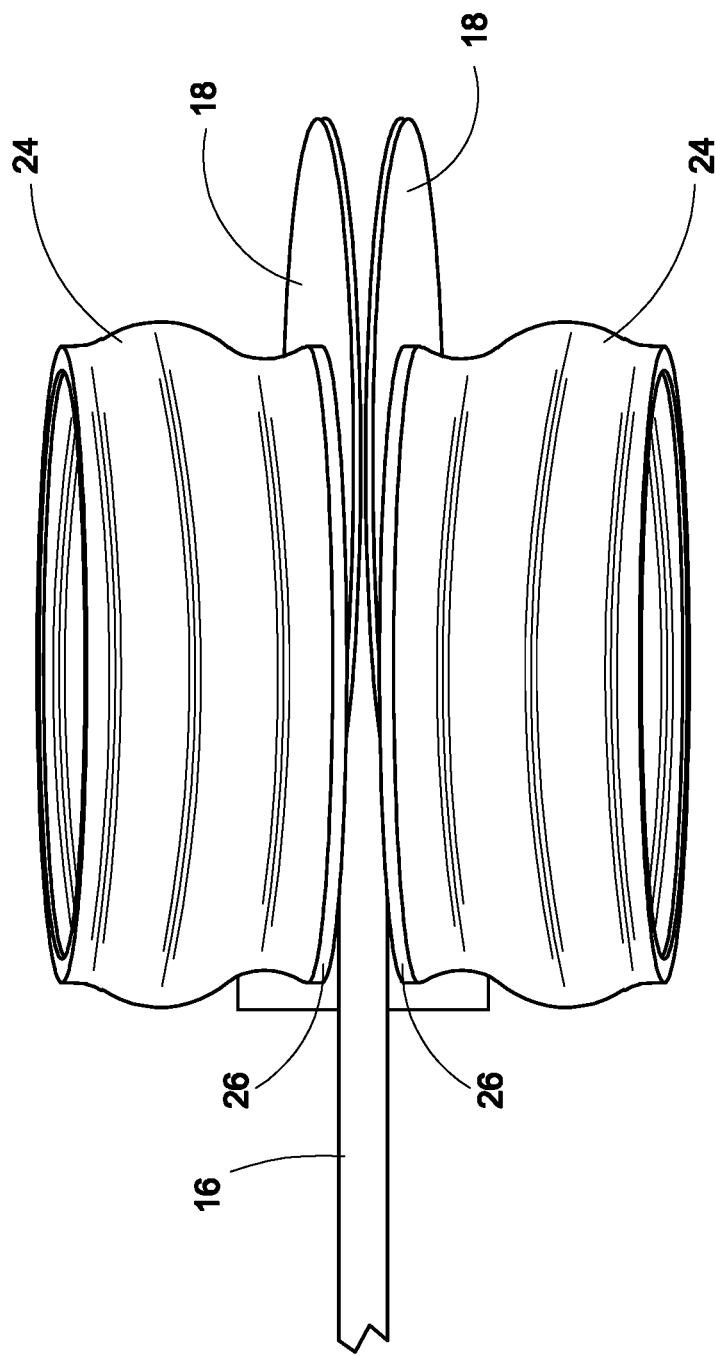

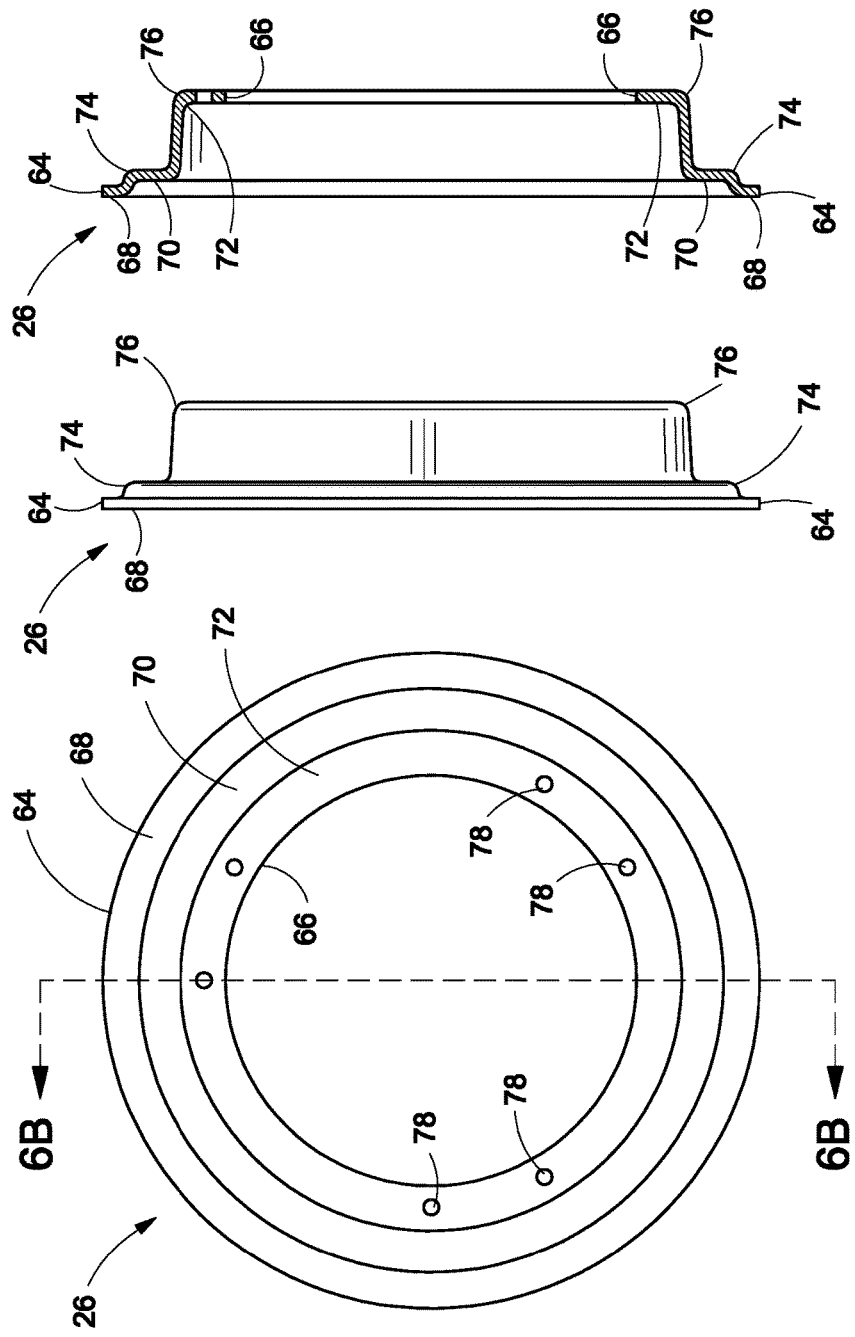

GAUGE WHEEL WEAR EXTENDER AND DISC SCRAPER FOR CROP PLANTERS AND SINGLE DISC AIR DRILLS

CROSS-REFERENCE TO A RELATED APPLICATION

This application claims priority to U.S. Provisional Patent Application No. 62/287,437 filed on Jan. 26, 2016.

FIELD OF THE INVENTION

This invention relates to agriculture. More specifically and without limitation, this invention relates planters and related devices used in farming.

BACKGROUND OF THE INVENTION

According to the USDA's Major Uses of Land in the United States, 2002 survey, it is estimated that there are approximately 442 million acres of cropland. Since the advent of mechanization, much of this cropland is planted every spring by pulling a planter behind a tractor. Planting is a very condition-sensitive and time-sensitive event to achieve optimal yields.

From a timing perspective, in the Midwest for example, farmers have a very narrow window that is optimal for planting that falls shortly after the fields thaw and after the risk of snow or a heavy frost is minimal. If planting occurs before the optimal window, entire fields or entire farms can be killed by a late frost or a late snow storm. If planting occurs later than is optimal, the plants may not have sufficient time to grow which can substantially affect yields.

From a conditions perspective, the fields must be relatively dry and free from substantial wet-spots. To complicate matters further, preferably planting occurs when there are warm temperatures and light rain in the forecast. If planting occurs when the fields are too wet, the tractor and planter can get stuck in the fields. Even if the tractor or planter do not get stuck, if planting occurs when it is too wet the condition of the soil can prevent or reduce the emergence of the seeds. If planting occurs when it is too dry and there is no rain in the forecast, the seeds may not germinate.

It is critical to a successful season that farmers plant when the timing is right and when the conditions are right. However, due to the fact that farms are growing larger and larger, increasingly farmers are forced to plant when conditions are less than optimal.

Back in the 1970's John Deer of Moline Ill., introduced a new design of row crop planters that utilized a gauge wheel with a tire running along each side of two discs arranged in a V-shape. By placing the gauge wheel and tire along each side of the disc, this allowed for much improved seed placement and improved packing of the soil around the seed. As part of the design, the tire was to engage the outside surface of the disc and act as a scraper to keep wet soil from building up on the disc. In this way, engagement of the wheel on the disc was to keep the inside of the gauge wheel clean and free of dirt and debris. This general design concept is now used on most crop planters and single disc air drills. While effective at depth control, this design suffers from many problems that have frustrated users for years.

One problem with this design is related to the flexible rubber or rubber-like tire being used as a scraper to remove the wet soil from the outside of the disc. To scrape soil from the disc, the tire must be kept tight against the outside of the disc. This engagement causes premature wear on the tire requiring early replacement.

Another problem with this design relates to the flexible material the tire is formed of, which is a flexible rubber or rubber-like material. While the flexibility of the tire is helpful for reducing shock and vibration during use, the flexibility of the tire can cause operational problems when serving as a scraper. That is, due to the inherent flex in the tire, the tire may not be able to adequately keep the disc clean. This is especially true after some operational wear occurs and when planting in particularly muddy conditions or in certain soil types.

When buildup occurs this often requires the gauge wheel and tire to be removed and cleaned. In addition, the tire may need to be re-adjusted to compensate for wear or replaced altogether. These delays are costly and time consuming and incredibly frustrating especially when they occur during the narrow planting window.

Several attempts have been made to solve this problem. These attempts include adding various scrapers to the inside of the gauge wheel and making the gauge wheel open to allow the scraped mud to work its way out of the wheel. These attempts have only been partially successful. However, these attempts at providing a solution have created other problems themselves. This includes adding additional components to the planting system that themselves must be maintained, adding cost to the system and adding complexity to the system.

Therefore, for all the reasons stated above, and the reasons stated below, there is a need in the art for a gauge wheel wear extender and disc scraper for crop planters and single disc air drills.

Thus, it is a primary object of the invention to provide a gauge wheel wear extender and disc scraper for crop planters and single disc air drills that improves upon the state of the art.

Another object of the invention is to provide a gauge wheel wear extender and disc scraper for crop planters and single disc air drills that provides enhanced performance.

Yet another object of the invention is to provide a gauge wheel wear extender and disc scraper for crop planters and single disc air drills that has a long useful life.

Another object of the invention is to provide a gauge wheel wear extender and disc scraper for crop planters and single disc air drills that does a better job of scraping than prior art systems.

Yet another object of the invention is to provide a gauge wheel wear extender and disc scraper for crop planters and single disc air drills that utilizes a minimum number of parts.

Another object of the invention is to provide gauge wheel wear extender and disc scraper for crop planters and single disc air drills that increases the interval between when a planter must be adjusted.

Yet another object of the invention is to provide a gauge wheel wear extender and disc scraper for crop planters and single disc air drills that operates effectively in muddy conditions.

Another object of the invention is to provide gauge wheel wear extender and disc scraper for crop planters and single disc air drills that operates effectively in a broad array of soils.

Yet another object of the invention is to provide a gauge wheel wear extender and disc scraper for crop planters and single disc air drills that operates effectively in a broad array of conditions.

Another object of the invention is to provide gauge wheel wear extender and disc scraper for crop planters and single disc air drills that reduces the number of times a planter must be stopped to clean out the gauge wheel.

Yet another object of the invention is to provide a gauge wheel wear extender and disc scraper for crop planters and single disc air drills that reduces maintenance.

Another object of the invention is to provide gauge wheel wear extender and disc scraper for crop planters and single disc air drills that reduces downtime.

Yet another object of the invention is to provide a gauge wheel wear extender and disc scraper for crop planters and single disc air drills that extends the range of adjustment.

Another object of the invention is to provide gauge wheel wear extender and disc scraper for crop planters and single disc air drills that improves accuracy of planting.

Yet another object of the invention is to provide a gauge wheel wear extender and disc scraper for crop planters and single disc air drills that improves yield.

Another object of the invention is to provide gauge wheel wear extender and disc scraper for crop planters and single disc air drills that keeps the exterior surface of the disc clean.

Yet another object of the invention is to provide a gauge wheel wear extender and disc scraper for crop planters and single disc air drills that is inexpensive.

Another object of the invention is to provide gauge wheel wear extender and disc scraper for crop planters and single disc air drills that can be used on practically any planter.

Yet another object of the invention is to provide a gauge wheel wear extender and disc scraper for crop planters and single disc air drills that is easy to install.

Another object of the invention is to provide gauge wheel wear extender and disc scraper for crop planters and single disc air drills that is easy to adjust.

Yet another object of the invention is to provide a gauge wheel wear extender and disc scraper for crop planters and single disc air drills that is easy to replace.

Another object of the invention is to provide gauge wheel wear extender and disc scraper for crop planters and single disc air drills that is safe to use.

Yet another object of the invention is to provide a gauge wheel wear extender and disc scraper for crop planters and single disc air drills that provides clean openings in the soil for planting.

Another object of the invention is to provide gauge wheel wear extender and disc scraper for crop planters and single disc air drills that is easy to use.

Yet another object of the invention is to provide a gauge wheel wear extender and disc scraper for crop planters and single disc air drills that is simple to use.

Another object of the invention is to provide gauge wheel wear extender and disc scraper for crop planters and single disc air drills that is high quality.

Yet another object of the invention is to provide a gauge wheel wear extender and disc scraper for crop planters and single disc air drills that has a robust design.

Another object of the invention is to provide gauge wheel wear extender and disc scraper for crop planters and single disc air drills that is durable.

Yet another object of the invention is to provide a gauge wheel wear extender and disc scraper for crop planters and single disc air drills that improves efficiencies.

Another object of the invention is to provide gauge wheel wear extender and disc scraper for crop planters and single disc air drills that saves time and reduces the frustrations associated with inadequate scraping of mud.

These and other objects, features, or advantages of the invention will become apparent from the specification, figures and claims.

SUMMARY OF THE INVENTION

A wear extender is presented for use with planters, air seeders and drills that utilize the engagement of a flexible wheel with a disc to scrape mud from the side of the disc. The wear extender is formed of an ultra-high molecular weight plastic that is compression molded. The wear extender is generally cylindrical in shape and when installed covers the interior edge of the tire. Installation of the wear extender extends the life of the tire and reduces the need to replace the tire. In addition, due to the more-rigid nature of the wear extender as compared to the more-flexible nature of the tire, the wear extender does a better job of scraping mud than the tire. As such, use of the wear extender reduces the amount of downtime that occurs due to poor scraping and reduces the amount and cost of maintenance due to tire wear.

BRIEF DESCRIPTION OF THE DRAWINGS

FIG. 2 is close up side elevation view of the conventional planter shown in FIG. 1 with the gauge wheel wear extender and disc scraper for crop planters and single disc air drills attached thereto;

FIG. 3A is a close-up front elevation view of the conventional planter shown in FIGS. 1 & 2, the view showing a pair of discs positioned at an angle to one another and a gauge wheel with a surrounding tire positioned on the outside of each disc, the view showing the discs slicing into the soil and forming a pocket for placing seeds in, the view also showing the wear extender on the interior edge of the tire and gauge wheel, the view showing the wear extender engaged with the exterior surface of the disc;

FIG. 3B is a close-up front cut-away elevation view of FIG. 3A, the view showing a pair of discs positioned at an angle to one another and a gauge wheel with a surrounding tire positioned on the outside of each disc, the view showing the discs slicing into the soil and forming a pocket for placing seeds in, the view also showing the wear extender on the interior edge of the tire and gauge wheel, the view showing the wear extender engaged with the exterior surface of the disc;

FIG. 4 is a close-up bottom elevation view of the conventional planter shown in FIGS. 1, 2 and 3, the view showing a pair of discs positioned at an angle to one another and a gauge wheel with a surrounding tire positioned on the outside of each disc, the view also showing the wear extender on the interior edge of the tire and gauge wheel, the view showing the wear extender engaged with the exterior surface of the disc;

FIG. 5 is a side elevation view of the wear extender;

FIG. 6A is a front elevation view of the wear extender;

FIG. 6B is a front cut-away elevation view of FIG. 6A of the wear extender;

DETAILED DESCRIPTION OF THE INVENTION

Figure 1:
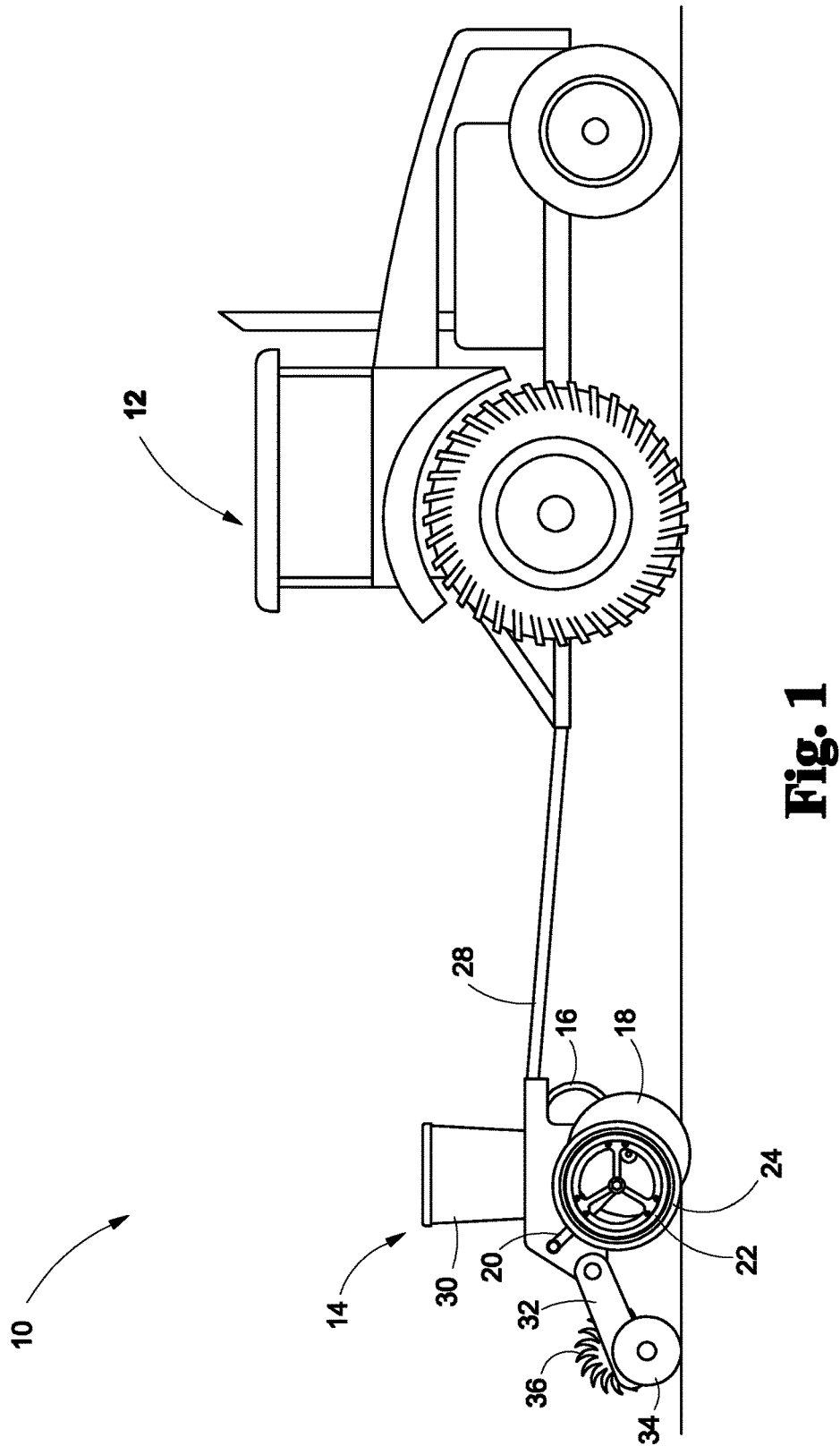
FIG. 1 is a side elevation view of a conventional tractor pulling a conventional planter with the gauge wheel wear extender and disc scraper for crop planters and single disc air drills attached thereto.
Figure 7:
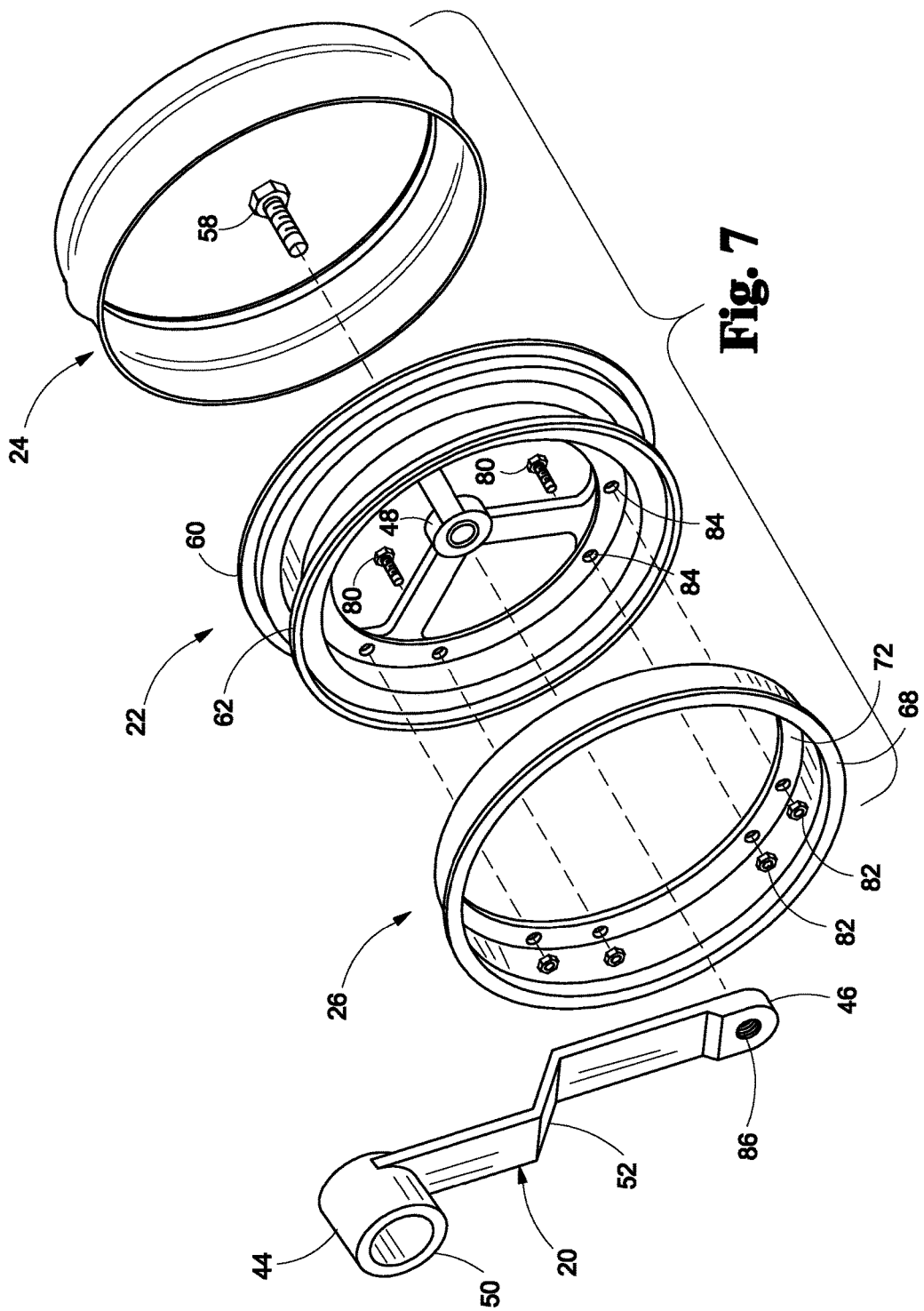
FIG. 7 is a perspective exploded view of the support arm, wear extender gauge wheel and tire.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the invention.

With reference to the figures, a gauge wheel wear extender and disc scraper system 10 (system 10) for use with for crop planters and single disc air drills is presented. In the arrangement shown, gauge wheel wear extender and disc scraper system 10 is used in association with a tractor 12 with an attached planter 14. The system 10 also includes a disc support 16, discs 18, support arms 20, gauge wheels 22, tires 24 and wear extenders 26, among other components as is further described herein.

Tractor:

Gauge wheel wear extender and disc scraper system 10 is shown in use with a tractor 12. Tractor 12 is formed of any suitable size, shape and design and is configured to pull planter 14 and the other components of the system 10 through a field while planting as is further described herein. In the arrangement shown, as one example, tractor 12 is a conventional tractor such as those made by John Deer, Case IH, Kubota, New Holland or the like, however any other type of tractor is hereby contemplated for use as is self-propelled planters or other vehicles that are used for planting purposes. As such, the term "tractor" used herein shall be broadly construed to include any vehicle used for planting purposes, unless specifically specified otherwise. In the arrangement shown, planter 14 is connected to the rearward end of tractor 12 and is pulled through a field by tractor 12.

Planter:

Gauge wheel wear extender and disc scraper system 10 is used in association with a planter 14. Planter 14 is formed of any suitable size, shape and design and is configured to plant seeds in a field. In the arrangement shown, as one example, planter 14 is a conventional planter such as those manufactured John Deere, Kinze, Case IH and the like, however any other type of planter is hereby contemplated for use. As such, the term "planter" used herein shall be broadly construed to include any device used to plant seeds, including conventional planters, grain drills, air seeders and the like, unless specifically specified otherwise.

In the arrangement shown, as one example, among other components, planter 14 includes a frame member 28 that facilitates connection to tractor 12 and provides support for the components of planter 14. Planter 14 includes a seed container 30 that holds bulk seed prior to seed being metered and deposited into the ground. Planter 14 includes a disc support 16 that is connected to frame member 28 and discs 18 and provides support for discs 18. Planter 14 includes support arm 20 that is connected to frame member 28 and gauge wheel 22 and provides support for gauge wheel 22, tire 24 and wear extender 26. Planter 14 also includes a trailing arm 32 connected to a packing roller 34 and/or a harrow 36. Packing roller 34 is any device that serves to smooth the soil and/or close the opening made to receive seed by the planter 14. Harrow 36 is any device that serves to disturb the soil after the planter 14 such as a plurality or rolling tines, drag chains, or any other soil disturbing device.

Planter 14 may be any size and may simultaneously plant any number of rows from one row to 48 rows or more. While only a single row unit is shown or described, it is hereby contemplated that the configuration described herein is repeated for all of the rows of planter 14.

Disc Support:

Gauge wheel wear extender and disc scraper system 10 includes disc support 16. Disc support 16 is formed of any suitable size, shape and design and is configured to provide support for discs 18. In the arrangement shown, as one example, disc support 16 connects at its upper end to frame member 18 of planter 14 and connects at its lower end to hub 38. Hub 38 connects to a pair or opposing discs 18 and facilitates connection to disc support 16 while facilitating rotation of discs 18 thereon. In the arrangement shown, disc support 16 curves in an arcuate nature from its upper end to its lower end. This curvature, allows for some give or spring of the discs 18 during planting when obstacles are encountered in the field during planting.

Discs:

Gauge wheel wear extender and disc scraper system 10 includes one or more discs 18. Discs 18 are formed of any suitable size, shape and design and is configured to slice into the ground during planting thereby opening a slot in the ground for planting seeds therein. In the arrangement shown, as one example, discs 18 circular discs that are connected at their center to hub 38 that facilitates positioning of discs 18 as well as rotation of discs 18. In this way, hub 38 defines the axis of rotation of discs 18. In the arrangement shown, discs 18 are relatively flat when viewed from an end, however any other arrangement is hereby contemplated for use such as a curved or dish-shaped disc 18 when viewed from an end.

In the arrangement shown, a pair of discs 18 are connected to hub 38 at their center. Hub 38 positions these opposed discs 18 at an angle to one another such that the lower end 40 of the opposing discs 18 are in engagement with one another or in close proximity to one another, while the upper end 42 of discs 18 are positioned at a distance to one another. Positioning discs 18 in this angular arrangement to one another facilitates the discs 18 making a point at their lower end 40 that slices cleanly into the ground, while providing space between the discs 18 at their upper end 40 to facilitate disc support 16 to extend into the area between opposing discs 18.

To provide maximum durability, discs 18 are formed of a metallic material, such as iron, steel or another alloy, however any other material or alloy is hereby contemplated for use.

Support Arms:

Gauge wheel wear extender and disc scraper system 10 includes one or more support arms 20. Support arms 20 are formed of any suitable size, shape and design and are configured to provide support to gauge wheels 22 and therefore tires 24 and wear extenders 26 as well. In the arrangement shown, as one example, support arms 20 are a relatively elongated member that connect at their upper end 44 to frame member 18 of planter 14 and connect at their lower end 46 to hub 48 of gauge wheel 22. Hub 48 facilitates connection of gauge wheel 22 to support arm 20 while also facilitating rotation of gauge wheel 22 and therefore tire 24 and wear extender 26 connected thereto. In this way, the connection of the hub 48 of gauge wheel 22 to the lower end 46 of support arm 20 defines the axis of rotation of gauge wheel 22, tires 24 and wear extenders 26.

In the arrangement shown, the upper end 44 of support arm 20 includes a circular collar member 50 that is configured to rotatably connect to the frame member 28 of planter 14. Collar member 50 and its rotatable connection to frame member 28 facilitates articulation of gauge wheel 22 when obstacles are encountered in the field. Support arm 20 also includes a step 52 between upper end 44 and lower end 46. Step 52 accommodates for the width of gauge wheel 22 and tire 24 and facilitates the insertion of support arm 20 between the narrow opening between the gauge wheels 22 and tires 24 at their upper end 54.

Support arm 20 positions gauge wheel 22 and therefore tire 24 and wear extender 26 with respect to disc 18. In the arrangement shown, support arm 20 positions the gauge wheel 22 and therefore tire 24 and wear extender 26 at an angle to vertical, much like hub 38 positions discs 18 at an angle. In one arrangement, support arm 20 positions gauge wheel 22 and therefore tire 24 and wear extender 26 at the same angle as disc 18. In the arrangement shown, support arm 20 positions gauge wheel 22 and therefore tire 24 and wear extender 26 such that the lower end 56 of gauge wheel 22 and therefore tire 24 and wear extender 26 is adjacent the exterior surface of disc 18. More specifically, when viewed from front or behind, as is shown in FIG. 3B, support arm 20 positions the lower end 56 of wear extender 26 such that it is in engagement with the exterior surface of disc 18. As a result of this angular positioning, as is also shown in FIG. 3B, the upper end 54 of gauge wheel 22 and therefore tire 24 and wear extender 26 are positioned a distance apart from the opposing gauge wheel 22, tire 24 and wear extender 26 with a space there between. As is also shown in FIG. 3B, the lower end 56 of gauge wheel 22, tire 24 and wear extender 26 are positioned a distance above the lower end 40 of discs 18; and similarly, the upper end 54 of gauge wheel 22, tire 24 and wear extender 26 are positioned a distance above the upper end 54 of disc 18.

In one example, as is shown in FIG. 2, the axis of rotation of gauge wheel 22 and therefore tire 24 and wear extender 26 is positioned a distance above and a distance behind the axis of rotation of discs 18. This the exterior diameter of gauge wheel 22 and therefore tire 24 and wear extender 26 to be offset, upward and rearward, to the exterior diameter of disc 18. Gauge wheel 22 and therefore tire 24 and wear extender 26 are vertically offset from discs 18 approximately the distance that discs 18 protrude into the ground.

When two discs 18 are used, one support arm 20 is used on the outside surface of each disc 18, as is shown.

Gauge Wheel:

Gauge wheel wear extender and disc scraper system 10 includes a gauge wheel 22. Gauge wheel 22 is formed of any suitable size, shape and design and is configured to provide support and rigidity to tire 24. While any configuration of a wheel is hereby contemplated for use for gauge wheel 22, in the arrangement shown, as one example, gauge wheel 22 is a round wheel that includes a plurality of spokes that connect at their center to hub 48. Gauge wheel 22 connects at its center, hub 48, to the lower end 46 of support arm 20 and rotates there on. In the arrangement shown, hub 48 of gauge wheel 22 connects to the lower end 46 of support arm 20 by a connecting member 58. Connecting member 58 is any device that connects two components together such as a screw, bolt, axle or the like. A tire 24 is connected to the exterior circumference of gauge wheel 22.

When viewed from the side, gauge wheel 22 extends from an exterior edge 60 to an interior edge 62. Wear extender 26 connects to the interior edge 62 of gauge wheel 22.

In one arrangement, gauge wheel 22 is formed of two rim halves that are connected together with a plurality of fasteners 82, as is further described herein, and the wear extender 26 connects to the pre-existing holes used to connect the two rim halves together.

Tire:

Gauge wheel wear extender and disc scraper system 10 includes a tire 24. Tire 24 is formed of any suitable size, shape and design and is configured to surround the exterior circumference of gauge wheel 22 and to provide give, shock absorption, and vibration dampening to the system 10. To provide this shock absorption and vibration dampening, tire 24 is formed of a flexible material such as rubber, synthetic rubber or any other flexible material.

Wear Extender:

Gauge wheel wear extender and disc scraper system 10 includes a wear extender 26. Wear extender 26 is formed of any suitable size, shape and design and is configured to cover the inward edge of gauge wheel 22 and tire 24 and engage the exterior surface of disc 18 and facilitates scraping of dirt and mud off of the disc 18.

In the arrangement shown, as one example, wear extender 26 is generally circular in shape when viewed from the side and includes an exterior edge 64, that defines the maximum diameter of the wear extender 26, and an interior edge 66 that defines the minimum diameter of the wear extender as well as the hollow interior. In the arrangement shown, as one example, wear extender 26 includes an engagement section 68, a middle section 70 and a connection section 72. In the arrangement shown, as one example, wear extender 26 also includes a first transition 74 that connects engagement section 68 and middle section 70 and a second transition 76 that connects middle section 70 and connection section 72. This arrangement of engagement section 68, middle section 70, connection section 72, first transition 74 and second transition 76 is configured to match or meet the size and shape of gauge wheel 22. As such, any other shape is hereby contemplated for use to match or meet the shape of other gauge wheels 22.

In the arrangement shown, when viewed from in front or behind, the engagement section 68 has a relatively flat face that is configured to engage the exterior surface of disc 18 and thereby scrape dirt off of the disc 18. When installed, the engagement section 68 is configured to cover the interior edge of tire 24 and/or gauge wheel 22. The first transition 74 steps in a distance and connects the inward edge of engagement section 68 to the outward edge of the middle section 70. Similarly, the second transition 76 steps in a distance and connects the inward edge of the middle section 70 to the outward edge of the connection section 72.

Connection section 72 includes a plurality of openings 78 therein that are configured to receive fasteners 80 therein. Fasteners 80 are formed of any device that connects two components together such as a screw, bolt, or the like and extend through a portion of gauge wheel 22 and openings 78 in wear extender 26. In the arrangement shown, a conventional nut is used to connect on to the fastener 80 and connect the wear extender 26 to the gauge wheel 22.

In one arrangement, wear extender 26 is formed of a plastic material that is rigid and durable and wear resistant. In one arrangement, wear extender 26 is formed of an ultra-high molecular weight (UHMW) plastic material. In one arrangement, to provide superior wear resistance wear extender 26 is formed through a compression molding process. Compression molding is a method of molding in which the molding material, is preheated, placed in an open, heated mold cavity. The mold is then closed with heat and pressure applied to force the material into contact with all mold areas. The part is then allowed to cure within the mold over time and by cooling. While more expensive and more time consuming than injection molding, the resulting wear extender 26 has a higher density, is of higher quality and has higher durability than parts formed by other processes.

In one arrangement, the engagement section 69 of wear extender 26 is approximately ¼ of an inch thick, however any other thickness is hereby contemplated for use. By adding a wear extender 26 to an already worn tire 24, this increases the life of the tire. In addition, due to the vertical height of the engagement section 68, there is a substantial increase in the amount of contact area between the wear extender 26 and the disc 18 as compared to the contact area between the tire 24 and the disc 18. This increased surface area provides improved scraping.

Also, the use of a plastic material, such as a UHMW material provides reduced friction between the wear extender 26 and the disc 18. This reduced friction is due to the lower coefficient of friction of the material of the wear extender 26 as compared to the coefficient of friction of the tire 24. This lower amount of friction facilitates smoother operation with less friction and less wear.

Assembly:

To install the wear extender 20 on a conventional planter 14, as is shown, the gauge wheels 22 with attached tires 24 are removed by removing connecting member 58 from the lower end 46 of support arm 20. Once removed, the wear extender 26 is placed on the interior surface of gauge wheel 22 and tire 24. Care is taken to ensure that the engagement section 68 of the wear compensator 26 covers the interior edge or surface of tire 24 and/or gauge wheel 22. Once in position, fasteners 80 are passed through the connection section 72 of wear extender 26 and through openings 84 in gauge wheel 22 and the wear extender 26 and gauge wheel 22 are tightened in place using nuts 82.

Once the wear extender 26 is installed on gauge wheel 22, the gauge wheel 22, tire 24 and installed wear extender 26 are installed on the planter 14 by aligning the hub 48 of gauge wheel 22 with the opening 86 in the lower end 46 of support arm 20 and once aligned inserting connecting member 58 there through. The gauge wheel 22, tire 24 and installed wear extender 26 are adjusted to ensure that the interior surface of the engagement section 68 of wear extender 26 is in relatively flat and flush engagement with the exterior surface of disc 18 at their lower end where the wear extender 26 and disc 18 overlap with one another. This process is repeated for all discs 18 and all gauge wheels 22 of the planter 14.

Over time, due to the engagement between the engagement section 68 of wear extender 26 and the disc 18, overtime the wear extender 26 will wear down. To compensate for this wear, the wear compensator 26 can be moved closer and into tighter engagement with disc 18 by adjusting connecting member 58.

Over time, when the wear extender itself is worn out, the wear extender 26 may be replaced with a new wear extender 26 using the same process. Despite the wear extender 26 wearing down and needing to be replace, the use of the wear extender 26 protects the more-expensive, and more difficult to replace, tire 24 from wearing down and needing to be replaced. Also, by eliminating the need for the tire 24 to also scrape the soil off of the side of the disc 18 this allows tire 24 to be formed of the optimum material for performing its function, which will likely be a softer material that allows for increased flexion, less soil compaction, increased absorption of forces and increased longevity.

In Operation:

In operation, as the planter 14 is pulled through the field the discs 18 rotate as they penetrate the ground. Due to the two discs 18 being positioned at an angular alignment to one another, the discs 18 form a slice or opening in the soil that the planter 14 deposits seeds in. As the discs 18 rotate, when the soil has a high moisture content, the discs 18 tend to pick up clumps of soil on the exterior surface of the discs 18. As the discs 18 rotate around, this clumped soil engages the lower edge of wear extender 26, or more specifically the engagement section 68 of wear extender 26. Due to the close engagement between the exterior surface of disc 18 and the interior surface of the wear extender 26, the clumped soil is scraped away and off of the exterior surface of the disc 18.

From the above discussion it will be appreciated that the gauge wheel wear extender and disc scraper for crop planters and single disc air drills and related method of use presented herein improves upon the state of the art.

Specifically, the gauge wheel wear extender and disc scraper for crop planters and single disc air drills and related method of use presented herein: provides enhanced performance; has a long useful life; does a better job of scraping than prior art systems; utilizes a minimum number of parts; increases the interval between when a planter must be adjusted; operates effectively in muddy conditions; operates effectively in a broad array of conditions; operates effectively in a broad array of soils; reduces the number of times a planter must be stopped to clean out the gauge wheel; reduces maintenance; reduces the amount of downtime; is adjustable; improves accuracy of planting; improves yield; keeps the exterior surface of the disc clean; is inexpensive; can be used on practically any planter; is easy to install; is easy to adjust; is easy to replace; is safe to use; provides clean openings in the soil for planting; is easy to use; is simple to use; is high quality; has a robust design; is durable; improves efficiencies; saves time and reduces frustration associated with inadequate scraping of mud, among countless other advantages and improvements.

It will be appreciated by those skilled in the art that other various modifications could be made to the device without parting from the spirit and scope of this invention. All such modifications and changes fall within the scope of the claims and are intended to be covered thereby.

The invention claimed is:

1. A planter system, comprising:
   a disc connected to the planter;
   the disc configured to penetrate the ground to make an opening for the deposit of seed therein;
   a gauge wheel connected to the planter;
   a tire connected to the gauge wheel;
   a wear extender connected to the gauge wheel;
   the wear extender having an engagement section that covers an interior edge of the tire;
   wherein when the gauge wheel is installed, the engagement section of the wear extender engages an exterior surface of the disc;
   wherein the wear extender is mounted to an interior surface of the gauge wheel;
   wherein the wear extender overlaps an interior surface of the gauge wheel and the tire, and the engagement section of the wear extender engages an exterior surface of the disc such that the engagement section of the wear extender is between the tire and the disc.

2. The system of claim 1 wherein the disc is formed of a metallic material and the wear extender is formed of a plastic material.

3. The system of claim 1 wherein the wear extender is formed of an ultra-high molecular weight material.

4. The system of claim 1 wherein the wear extender is formed by compression molding.

5. The system of claim 1 wherein the wear extender is a separate component that is installed as an aftermarket piece.

6. The system of claim 1 an axis of rotation of the gauge wheel is positioned rearward and above an axis of rotation of the disc.

7. The system of claim 1 wherein a portion of the engagement section of the wear extender is in flush engagement with a portion of the exterior surface of the disc.

8. The system of claim 1 wherein the engagement section of the wear extender is in flush engagement with the exterior surface of the disc at a position that is below and rearward of the axis of rotation of the disc.

9. The system of claim 1 wherein the engagement section of the wear extender is positioned between the tire and the disc.

10. The system of claim 1 wherein the engagement section of the wear extender is positioned between the gauge wheel and the disc.

11. The system of claim 1 wherein the wear extender is mounted to the interior surface of the gauge wheel and wherein the shape of the wear extender contours to the shape of the interior surface of the gauge wheel from the interior diameter of the wear extender to the exterior diameter of the wear extender.

12. A planter system, comprising:
a disc connected to the planter system;
the disc configured to penetrate the ground to make an opening for the deposit of seed therein;
a gauge wheel connected to the planter system;
a tire connected to the gauge wheel;
a wear extender connected to the gauge wheel;
the wear extender having an engagement section that covers an interior edge of the tire;
wherein when the gauge wheel is installed, the engagement section of the wear extender engages an exterior surface of the disc;
wherein the wear extender overlaps an interior surface of the gauge wheel and the tire, and the engagement section of the wear extender engages an exterior surface of the disc such that the engagement section of the wear extender is between the tire and the disc;
wherein the exterior diameter of the wear extender is less than the exterior diameter of the tire so as to facilitate engagement of the ground by the tire while the wear extender is positioned above the ground.

13. A method of scraping mud from the disc of a planter, the steps comprising:
providing a planter having a disc, a gauge wheel and a tire;
providing a wear extender that is a separate component from the gauge wheel and the tire, the wear extender having an engagement section;
attaching the wear extender to the gauge wheel such that the engagement section of the wear extender engages an exterior surface of the disc, wherein the wear extender is mounted to an interior surface of the gauge wheel and the wear extender overlaps an interior surface of the gauge wheel and the tire, and the engagement section of the wear extender engages an exterior surface of the disc such that the engagement section of the wear extender is between the tire and the disc;
scraping mud from the surface of the disc by the engagement section of the gauge wheel.

14. The method of claim 13, wherein the gauge wheel is formed of a plastic material.

15. The method of claim 13 wherein the gauge wheel is formed of an ultra-high molecular weight material.

16. The method of claim 13 wherein the wear extender is formed through a compression molding process.

17. The method of claim 13 wherein the engagement section of the wear extender covers an interior peripheral edge of the tire.

* * * * *

UNITED STATES PATENT AND TRADEMARK OFFICE
CERTIFICATE OF CORRECTION

PATENT NO. : 10,136,572 B2
APPLICATION NO. : 15/339250
DATED : November 27, 2018
INVENTOR(S) : Weisz et al.

Page 1 of 1

It is certified that error appears in the above-identified patent and that said Letters Patent is hereby corrected as shown below:

In the Claims

Column 11, Line 12, Claim 6 should read as follows:
The system of claim 1 wherein an axis of rotation of the gauge wheel is positioned rearward and above an axis of rotation of the disc.

Signed and Sealed this
Fourteenth Day of May, 2019

Andrei Iancu
*Director of the United States Patent and Trademark Office*